No. 667,005. Patented Jan. 29, 1901.
J. DAVIS.
FILTER BOTTOM.
(Application filed Sept. 28, 1900.)
(No Model.) 2 Sheets—Sheet 1.

Witnesses
Franck L. Ourand
W. Parker Rinehl

Inventor
John Davis
By D. C. Reinohl
Attorney

THE NORRIS PETERS CO., PHOTO-LITHO., WASHINGTON, D. C.

No. 667,005. Patented Jan. 29, 1901.
J. DAVIS.
FILTER BOTTOM.
(Application filed Sept. 28, 1900.)
(No Model.) 2 Sheets—Sheet 2.
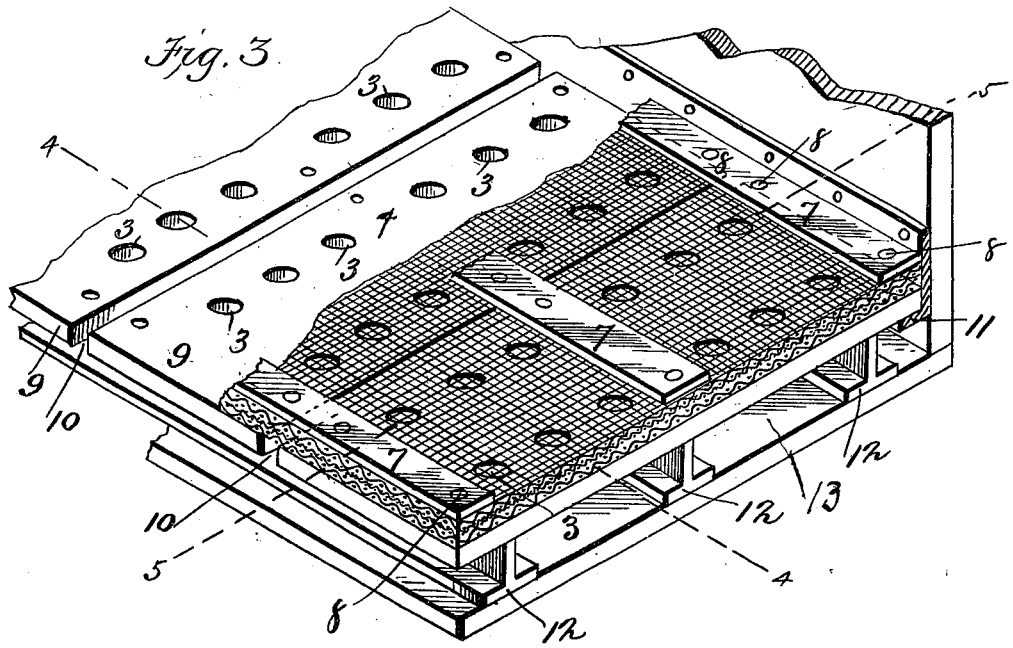
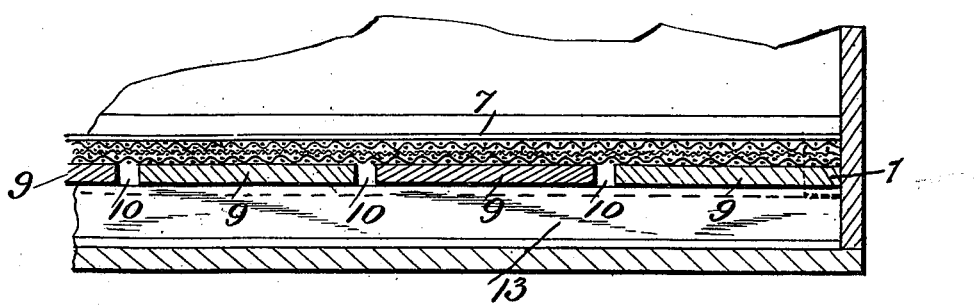
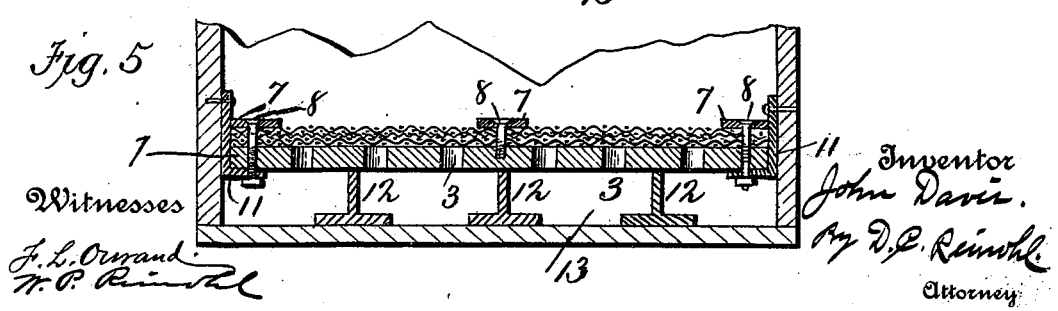

UNITED STATES PATENT OFFICE.

JOHN DAVIS, OF PITTSBURG, PENNSYLVANIA.

FILTER-BOTTOM.

SPECIFICATION forming part of Letters Patent No. 667,005, dated January 29, 1901.

Application filed September 28, 1900. Serial No. 31,398. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Filter-Bottoms; and I do hereby declare the following to be a full, clear, and exact description of the invention, such as will enable others skilled in the art to which it appertains to make and use the same.

My invention relates to filters for purifying liquids, such as water, has especial reference to that class of filters in which a granular bed is used for filtering the water, and has for its object a filter-bottom on which the granular bed rests; and it consists in certain improvements in construction, which will be fully disclosed in the following specification and claims.

Figure 1:
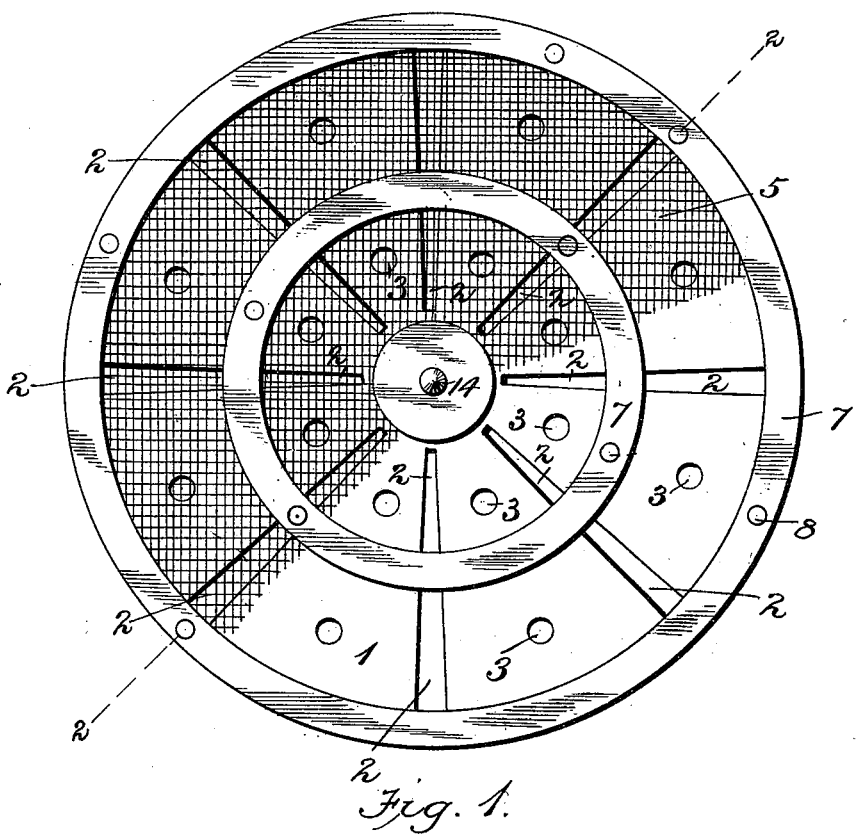
Figure 2:
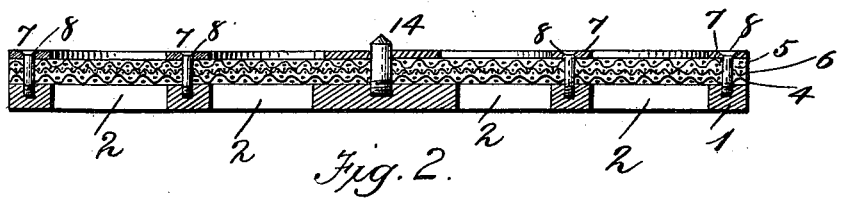

In the accompanying drawings, which form part of this specification, Figure 1 represents a top plan of a filter-bottom embodying my invention designed for use in cylindrical filters of comparatively small diameter; Fig. 2, a transverse section of the same on line 2 2, Fig. 1; Fig. 3, a perspective showing the filter-bottom applied to an angular filter and on an enlarged scale; Fig. 4, a vertical section on line 4 4, Fig. 3; and Fig. 5, a like view on line 5 5, Fig. 3.

Reference being had to the drawings and the designating characters thereon, 1 indicates the base of the filter-bottom and may be circular, as shown in Figs. 1 and 2, or rectangular, as shown in Figs. 3, 4, and 5, or of any other preferred form. In the circular form for use in filters of comparatively small diameter the base is provided with slots 2, which may be radial and tapering toward the center, as shown in Fig. 1, or the taper may be omitted and the sides of the slots made parallel, the purpose of the elongated openings being to cause the water passing upward through the bottom for the purpose of cleansing the granular bed to flow in an elongated column of sufficient volume or body to raise the bed forcibly and effect a thorough commingling of the particles and cleansing thereof by attrition. Between the slots or openings 2 are openings 3, preferably circular, as shown, through which the water passes in cylindrical streams of less volume and at a higher velocity and assists in the agitation of the particles of the granular bed.

Upon the base are placed sheets or layers of wire-cloth, preferably brass or aluminium bronze, the lower layer 4 and the upper layer 5 being coarse mesh and the intermediate layer 6 of fine mesh to prevent waste of the filter-bed through the bottom. The strata of wire-cloth are secured to the base 1 by clamping-plates 7, resting on the cloth, and through which pass bolts or rivets 8 and engage the base to prevent displacement by the upward flow of water passing through the bottom in cleansing the filter-bed. The elongated and the circular openings should be so graduated that they will afford a ready flow of the water admitted for cleansing the filter-bed with the minimum of friction or resistance in its passage through the base, so that its maximum force may be expended upon the granular bed to lift and agitate the same.

In large filters, whether cylindrical or rectangular in form, the base-plate is made in sections 9, as shown in Figs. 3, 4, and 5, and the plates separated to form the elongated openings 10, which extend across the filter from side to side or wall to wall. The strata of wire-cloth, as described, are then stretched across the entire bottom plates, covering the elongated openings 10, and the cloth and the base-plates secured together by the clamping-plates 7 and bolts 8, and the bolts on the ends of the plates extend through the flanges 11 on which the bottom rests. The plates or bottom also rest upon supports 12, which cross the filter at right angles with plates, and below the bottom is a chamber 13 for filtered water.

The circular bottom shown is Figs. 1 and 2 is provided with a step 14 to support the shaft of an agitator.

Having thus fully described my invention, what I claim is—

1. A filter-bottom having a perforated base, and wire-cloth arranged in separate layers over said base with a layer of fine mesh interposed between layers of coarse mesh, and clamping-plates resting upon the upper surface of the bottom and secured to the base by bolts passing through the wire-cloth and engaging the base for securing the wire-cloth to the base.

2. A filter-bottom having elongated openings, and openings intermediate thereof in the base, and a plurality of layers of wire-cloth covering said openings and secured to the base.

3. A filter-bottom having elongated openings, and openings intermediate thereof in the base, a plurality of layers of wire-cloth covering said openings with a layer of fine mesh interposed between layers of coarse mesh, and clamping-plates for securing the wire-cloth to the base.

In testimony whereof I affix my signature in presence of two witnesses.

JOHN DAVIS.

Witnesses:
WM. W. WISHART,
ALEXANDER WISHART.